United States Patent [19]
Hunt

[11] 3,709,124
[45] Jan. 9, 1973

[54] GAME RIFLE CAMERA

[76] Inventor: R. Brian Hunt, 17515 W. Nine Mile Road, Rochester, Mich. 48075

[22] Filed: Sept. 9, 1971

[21] Appl. No.: 179,095

[52] U.S. Cl. .................................... 95/12, 95/42
[51] Int. Cl. .......................................... G03b 29/00
[58] Field of Search ............................. 95/12, 42

[56] References Cited

UNITED STATES PATENTS

| | | | |
|---|---|---|---|
| 3,545,356 | 12/1970 | Nielsen | 95/12 |
| 2,182,097 | 12/1939 | Schenk | 95/42 |
| 2,910,913 | 11/1959 | Michel | 95/12 |

Primary Examiner—John M. Horan
Attorney—Daniel G. Cullen et al.

[57] ABSTRACT

A simulated rifle has a small camera mounted in its receiver portion, and an image-splitting mirror mounted above the receiver splits the image received from a telescopic sight so that the photographer can sight through the mirror and telescopic sight while the image is simultaneously reflected by the mirror to the camera lens. The picture may be taken by pulling the trigger of the rifle, which is connected to the camera shutter.

1 Claim, 2 Drawing Figures

PATENTED JAN 9 1973 3,709,124

INVENTOR.
R. BRIAN HUNT.
BY
CULLEN, SETTLE, SLOMAN & CANTOR
ATT'YS.

GAME RIFLE CAMERA

BACKGROUND OF INVENTION

The growing concern for preservation of various wildlife species, coupled with the popularity of photographic safaris into wildlife preserves has combined to make it desirable to produce a camera system capable of photographing wildlife at a distance while simultaneously satisfying the instincts of the hunter who is prohibited from or desires to avoid shooting his target.

Accordingly, it is the principal object of this invention to create a camera system in conjunction with a non-functioning rifle, whereby the photographer has available a system which looks like a rifle, is aimed like a rifle and which is "fired" like a rifle, but wherein the pulling of the trigger trips the shutter of the camera rather than firing a bullet.

DETAILED DESCRIPTION OF THE INVENTION

Figure 1:
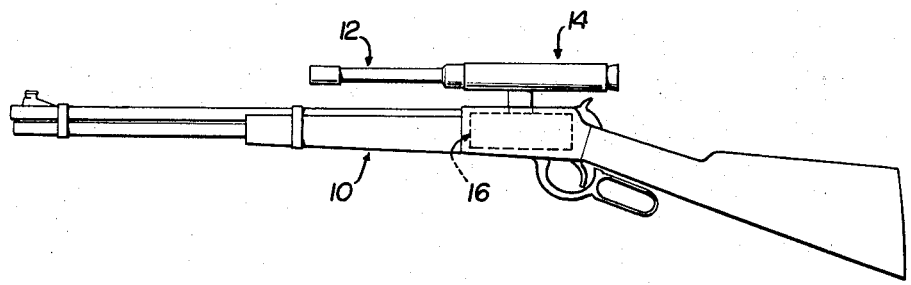
FIG. 1 is a side elevation of the simulated rifle camera system of this invention.

Referring to the drawings, the simulated rifle camera system of this invention generally comprises a rifle 10 on which is mounted a telescopic sight 12 connected to an adapter housing 14 which in turn connects to a camera housing 16 located in what is normally the receiver portion 18 of the rifle.

Figure 2:
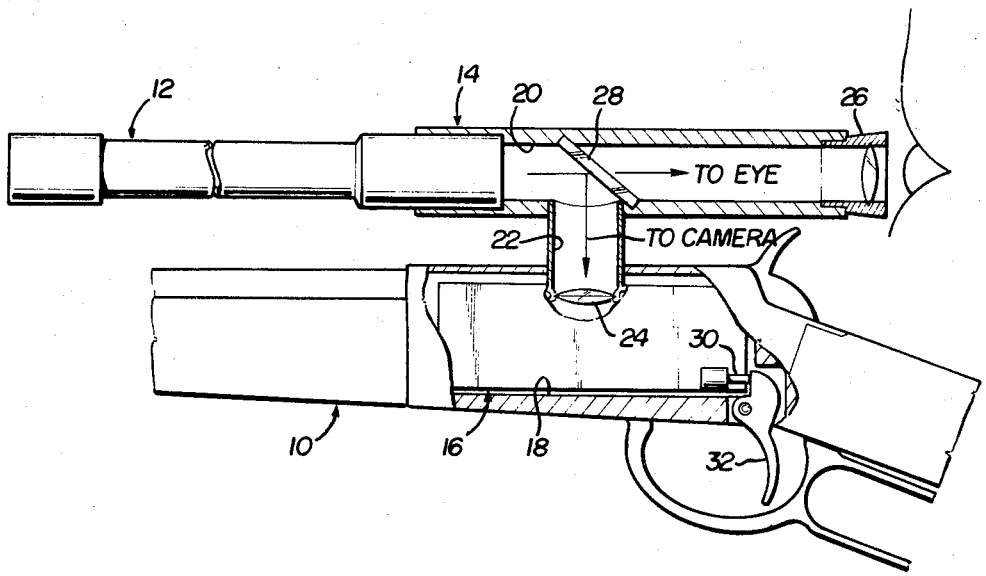
FIG. 2 is an enlarged view, partly in section, of the operable portion of the camera system of FIG. 1.

As best shown in FIG. 2, adapter housing 14 is generally T-shaped, and includes a horizontal open-ended bore 20 which communicates with a downwardly extending vertical bore 22. Horizontal bore 20 is aligned with the normal line of sight of a telescopic sight, and the forward end of adapter housing 14 receives the eyepiece end of telescopic sight 12. To provide adequate stability and rigidity for this structure, supplementary supporting brackets (not illustrated) may be provided, as will be understood by those skilled in the art.

An eye piece 26 is provided at the rearward end of horizontal bore 20, this being spaced at the appropriate optical distance from the eyepiece end of telescopic sight 12.

At the intersection of horizontal bore 20 and vertical bore 22 there is mounted in fixed position an image-splitting mirror 28. This image-splitting mirror, a commercially available product, simultaneously transmits an image through it while also reflecting it. Thus mirror 28 receives the incoming target image from the telescopic sight and reflects it downwardly through vertical bore 22 to camera lens 24 located within receiver 18 of rifle 10. Simultaneously, the photographer can aim through horizontal bore 20 and telescopic sight 12 to locate the target and properly aim the camera.

Adapter housing 14 is constructed and dimensioned so that the distance from the eyepiece lens of telescopic sight 12 to camera lens 24 measured along the reflected path of a ray of light passing therebetween will equal the focal length of the camera lens, so that the image will be full sized and properly focused at the camera. Since the eyepiece of the telescopic sight remains at a constant distance from lens 24 of the camera, the camera is constantly in focus, irrespective of the distance to the target itself.

To take the picture, once the camera has been properly aimed, the photographer actuates shutter release 30 of camera 16 by pulling simulated trigger 32 of the rifle. The interconnecting structure has been shown in simplified form, it being understood by those skilled in the arts that appropriate mechanical linkages could be provided to interconnect the trigger with the shutter release, wherever it might be on the camera.

One camera which has been successfully employed in the prototype is a Minolta 16 II 16mm camera having dimensions of 3 inches in length, 1½ inches in height, and ¾ of an inch in width.

Thus, it will be appreciated from the foregoing that the photographer is able to obtain his picture while simultaneously satisfying his hunting instincts, since he may stalk his target, aim and "fire", all in the conventional way. Physically and psychologically, he can imagine that he is firing a rifle in the conventional manner. His "trophy" is a photograph of the animal with the superimposed cross-hairs of the telescopic sight showing where he was aiming and where his "bullet" hit the target.

The present invention is to be distinguished from combined guns and cameras, such as shown in U.S. Pat. No. 3,545,356, in that this is a non-functioning rifle which retains the appearance of a functioning rifle, without any visible camera to detract from the photographer's authentic hunting sensations.

While the camera has been illustrated as located within the rifle receiver, it may also be positioned within the stock if dimensional considerations make that location preferable. In either position, however, the camera is concealed to avoid detracting from the authenticity of the rifle's appearance. If located within the stock, appropriate lenses and mirrors would be provided to transmit the image from the receiver to the camera, as will be understood by those skilled in the art.

As a further modification, the beam splitter could be located within the telescopic sight itself, rather than in the adapter which receives the standard telescopic sight. This alternative is again just a matter of convenience, and has no effect upon the function or operation of the invention.

This invention may be further developed within the scope of the following claims. Accordingly, the above specification is to be interpreted as illustrative of only a single operative embodiment of this invention, rather than in a strictly limited sense.

I now claim:

1. A camera system especially adapted for use by sportsmen who desire to photograph wild animals while simulating the physical and psychological sensations of the hunt, comprising:

a simulated but inoperative rifle resembling a hunting rifle, including a stock, receiver portion and trigger, the exterior of said rifle being essentially free of any apparatus not normally an operative part thereof;

an adapter housing secured to said rifle in a position over the conventional breech opening thereof, said adapter housing including a first hollow open-ended bore oriented so that its axis corresponds with the normal line of sight of the rifle, and a second hollow bore oriented substantially perpendicularly to and intersecting said first bore, said second bore extending downwardly from said first bore into said rifle breech opening;

a telescopic sight secured to said rifle and having its eyepiece end coaxially mounted within the forward end of said first hollow bore;

an image-splitting mirror mounted within said first hollow bore and arranged so that it reflects the magnified image received from said telescopic sight downwardly into said second hollow bore, said image-splitting mirror simultaneously transmitting the image through the rearward portion of said first hollow bore to enable the sportsman to observe the magnified image therethrough when he is in the normal sighting position relative to said rifle;

a small camera completely concealed within said rifle and arranged so that its lens receives the image reflected by said image-splitting mirror into said second hollow bore;

and means connected to said rifle trigger and to the shutter mechanism of said camera to cause the shutter to be released when said trigger is pulled;

whereby the aiming and firing of a rifle is simulated by the sighting and photographing of the target.

* * * * *